Nov. 11, 1924.　　　　　　　　　　　　　　1,515,567
A. J. FINNEGAN
VEHICLE FENDER
Filed May 6, 1924　　　　　2 Sheets-Sheet 2
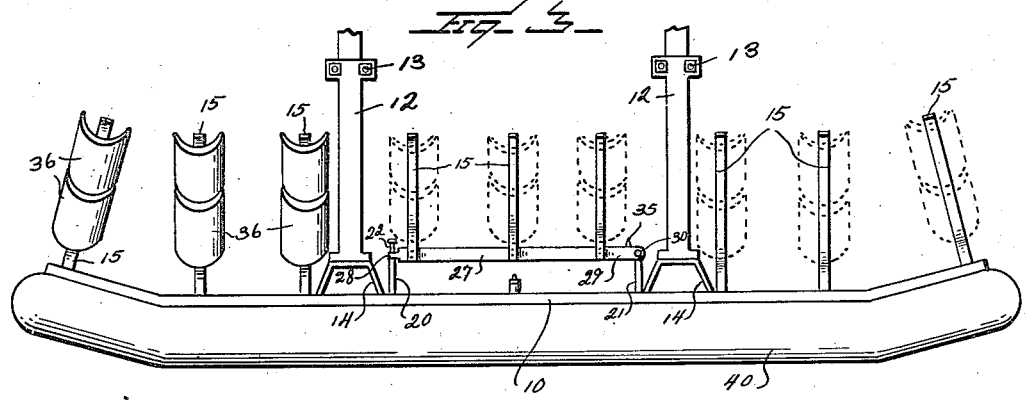
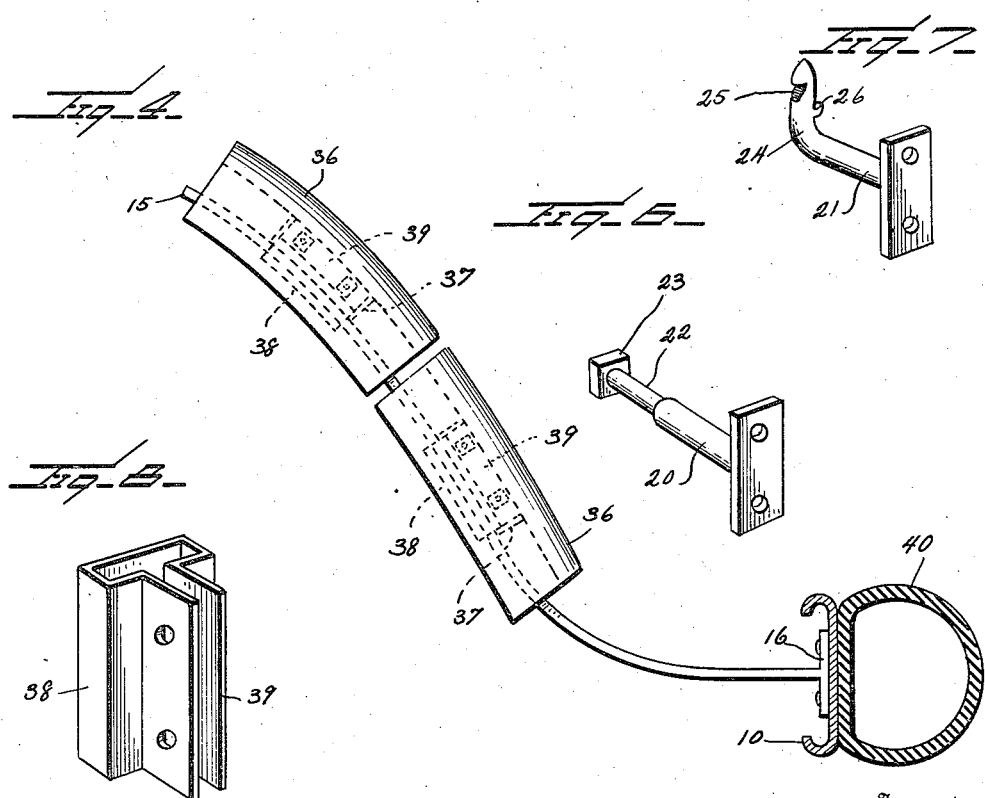
Inventor
A. J. Finnegan
By Watson E. Coleman
Attorney Patented Nov. 11, 1924.

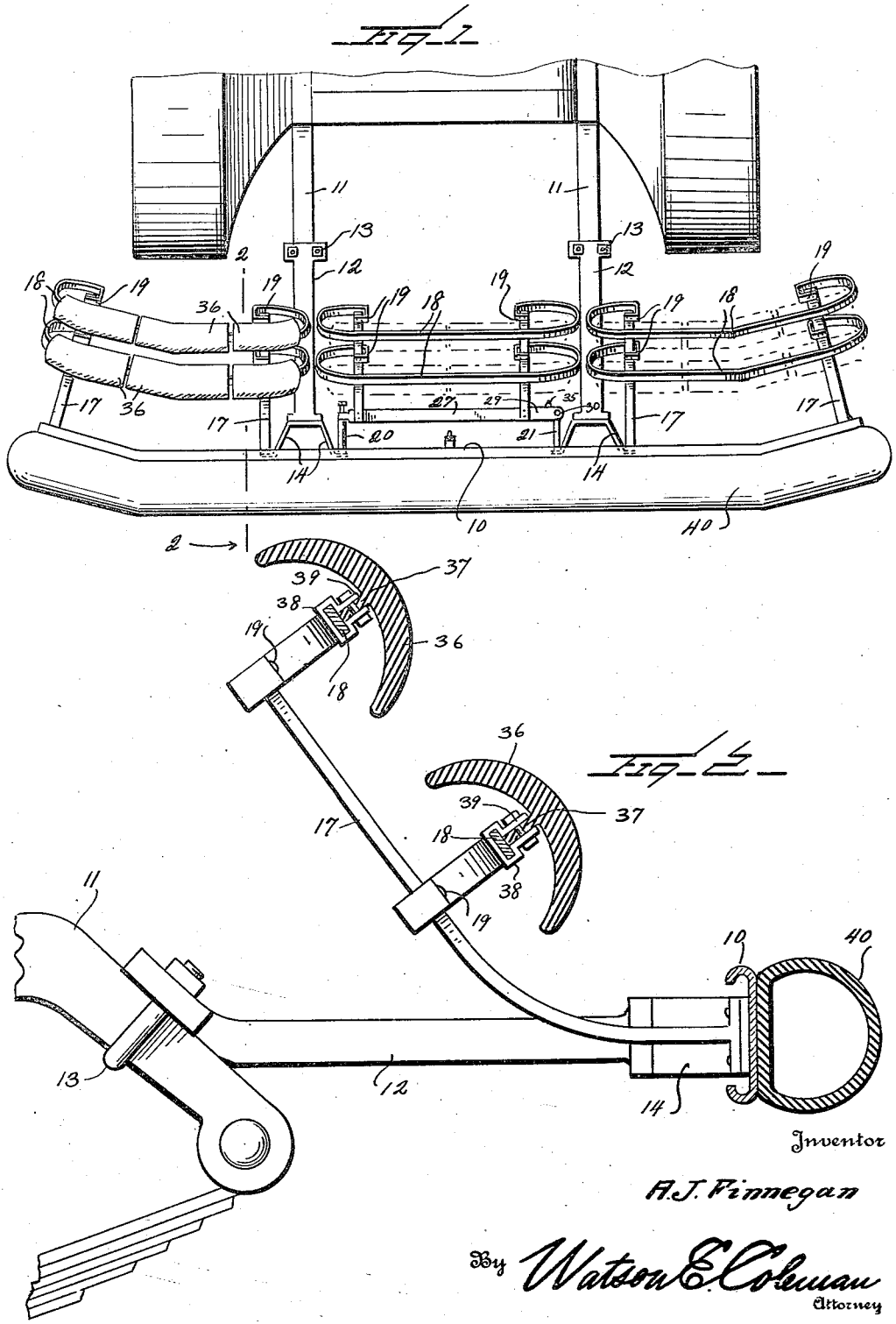

1,515,567

UNITED STATES PATENT OFFICE.

AMBROSE J. FINNEGAN, OF CASTALIA, IOWA.

VEHICLE FENDER.

Application filed May 6, 1924. Serial No. 711,443.

*To all whom it may concern:*

Be it known that I, AMBROSE J. FINNEGAN, a citizen of the United States, residing at Castalia, in the county of Winneshiek and State of Iowa, have invented certain new and useful Improvements in Vehicle Fenders, of which the following is a specification, reference being had to the accompanying drawings.

This invention relates to improvements in vehicle fenders and more particularly to that type of vehicle fender shown in my co-pending applications, Serial No. 703,464 and Serial No. 705,586, filed April 1, 1924 and April 10, 1924 respectively and entitled Vehicle fenders.

In the applications above identified I disclosed a construction of a fender having a main fender section upon which are mounted resiliently supported fingers combining to form a cage receiving a person struck by the fender and preventing their coming into contact with the body of the vehicle. In each of these constructions means are provided whereby certain of the resilient fingers can be shifted to permit the operator of the vehicle to have access to the crank thereof if necessary.

An important object of this invention is to provide an improved mounting for the sections and to further improve the construction of the resilient fingers and the mountings thereof.

A still further object of the invention is to provide means for applying to these fingers a cushioning element to prevent the fingers from injuring a person coming into engagement therewith.

These and other objects I attain by the construction shown in the accompanying drawings, wherein for the purpose of illustration is shown a preferred embodiment of my invention and wherein:—

Figure 1 is a plan view showing a fender constructed in accordance with my invention applied to a vehicle;

Figure 2 is a vertical sectional view therethrough;

Figure 3 is a plan view of a slightly modified form of fender;

Figure 4 is a vertical sectional view therethrough;

Figure 5 is a sectional view taken through the mounting bar for the central cage forming elements;

Figure 6 is a perspective of the pivot member;

Figure 7 is a perspective of the hasp member;

Figure 8 is a perspective view of the clamps employed for attaching the cushioning elements to the spring fingers.

Referring now more particularly to the drawings, the numeral 10 indicates a rigid fender bar extending transversely of the vehicle in advance thereof and supported from the vehicle frame 11 by rearwardly extending bracing and supporting bars 12 which are secured to the vehicle frame by clamping U-bolts 13. The forward ends of the supporting bars are provided with diverging arms 14 the ends of which engage the bar 10 at points spaced longitudinally thereof.

In the form shown in Figure 3 a plurality of spring fingers 15 are secured to the bar, each of these fingers comprising an attaching portion 16 adapted to be secured to the bar and a resilient portion extending upwardly and rearwardly from this attaching portion in forming the finger proper. Certain of the fingers 15 have their attaching portions secured to the bar 10 by the securing elements employed for securing the divergent arms 14 of the brace members 12 to the bar. In this form of construction the fingers 15 are separate elements and perform their cushioning functions independently.

In the form shown in Figure 1 rigid arms 17 arranged in pairs are carried by the bar, one pair in each instance being arranged outwardly of the brace 12 at this side of the bar 10 and a third pair being arranged intermediate these bars. Of those pairs arranged outwardly of the supporting bars 12 the innermost pair 17 is in each instance secured to the bar 10 by the securing elements of the arms 14 of the bars 12. These rigid arms 17 extend upwardly and rearwardly from the bar 10 and have secured thereto cushioning or buffer springs 18 each having reverted end portions 19 secured to the bars of the pair with which it is associated, these portions being spaced from the main body of the cushioning springs so that these springs are held in spaced relation to the bars and forwardly of the bars. Two springs are preferably applied to each pair of rigid arms 17.

Arranged intermediate the supports 12 upon the rear face of the transverse bar 10 are a pivot 20 and a hasp 21, each of these elements being secured to the bar 10 by the securing elements of the adjacent arm of the rigid supports 12. The pivot member 20 is provided with a reduced upwardly directed portion 22 having upon its upper end a limiting element 23. The hasp 21 has a similar upwardly directed portion 24 having in that face thereof next adjacent the pivot a notch 25 and provided forwardly of this notch with a stop shoulder 26.

The numeral 27 designates a bar having at one end a pivot loop 28 of less length than the pivot portion 22 of the pivot 20 and having secured to its opposite end a sleeve 29 having at its free end a pair of aligned openings 30 for the reception of the rearwardly directed portion 24 of the hasp. Mounted within the sleeve is a bolt 31 one end of which operates in an opening in the end of the bar 27 and the opposite end of which is designed for coaction with the notch 25 of the hasp plate. A spring 33 extends intermediate the end of the bar 27 and a shoulder 32 formed on the bolt and normally urges this bolt outwardly toward the free end of the sleeve 29. The sleeve 29 is provided in its side wall with a slot 34 through which extends an operating finger 35 by means of which the bolt may be retracted against the action of the spring.

In the first form described a plurality of the resilient fingers 15 are secured to this bar and are held in position thereby, while in the second form a pair of these fingers are secured to this bar 27. It will be seen that by releasing the bolt from the notch 25, the bar 27 may be moved bodily upwardly until the sleeve clears the upper end of the portion 24 of the hasp 21 when the bar may be swung upwardly and to one side about the pivot 22 to permit access to the starting crank.

In each construction the cushioning spring portions have applied to their faces a cushioning element such as rubber or the like. These cushioning elements preferably comprise sheets of rubber, indicated at 36, and having extending longitudinally of the rear face thereof flanges 37. Clamps 38 are provided which extend about the cushioning elements whether these be the springs 18 or the fingers 15 and fit these elements, the ends of these clamps being provided with upstanding flanges 39 receiving therebetween the flanges 37 of the rubber sheet. Securing elements extend through the flanges 39 so that they may be clamped together to secure the clamp in position upon the cushioning element 15 or 18, as the case may be, and at the same time clamp the flanges 37 of the supplemental cushioning elements 36 to prevent movement thereof. In this construction, as in my foregoing applications above identified, the front face of the rigid bar 10 has preferably mounted thereon a pneumatic cushioning element 40 for taking up minor shocks and for reducing heavier shocks which would otherwise be applied to the vehicle. It will be seen that a fender constructed in accordance with the foregoing will provide the usual protection afforded by a bumper bar and at the same time will reduce the harshness of shocks applied to the vehicle through this bumper bar and reduce injuries to persons or vehicles with which it may come in contact.

I claim:—

1. In combination with a vehicle fender comprising a rigid bar adapted to extend transversely of the vehicle, a cage supported from the bar and extending upwardly and rearwardly therefrom to receive a person engaged by the fender in passing thereover, the cage including independently shiftable resilient elements, cushioning pads arranged upon the front face of said cushioning elements and each embodying a flange, and clamp elements straddling the cushioning elements and engaging the flanges of said pads.

2. In combination with a vehicle fender comprising a rigid bar extending transversely of the vehicle, a cage supported from the bar and extending upwardly and rearwardly therefrom, said cage having a central section shiftable to permit access to the vehicle through the cage, and a mounting for said section comprising a pintle and hasp secured in spaced relation to said bar, said pintle being elongated, a hinge bar having a portion rotatable upon the pintle and of less width than the length of the pintle, the opposite end of the hinge bar being engageable with the hasp.

3. In combination with a vehicle fender comprising a rigid bar extending transversely of the vehicle, a cage supported from the bar and extending upwardly and rearwardly therefrom, said cage having a central section shiftable to permit access to the vehicle through the cage, a mounting for said section comprising a pintle and hasp secured in spaced relation to said bar, said pintle being elongated, a hinge bar having a portion rotatable upon the pintle and of less width than the length of the pintle, the opposite end of the hinge bar being engageable with the hasp, and a spring-pressed bolt arranged interiorly of the hinge bar and adapted for coaction with a notch formed in the hasp.

4. A vehicle fender comprising a rigid bar adapted to be disposed transversely of a vehicle, means for supporting said bar from the frame of a vehicle, a plurality of arms extending upwardly and rearwardly from the rear face of the rigid member, said arms being arranged in pairs, and cushioning springs connecting each pair of arms and each comprising a length of spring material formed at its ends with loops, the ends of said loops being secured to the arms of the respective pairs and maintaining the cushioning elements forwardly of and in spaced relation to said arms.

In testimony whereof I hereunto affix my signature.

AMBROSE J. FINNEGAN.